United States Patent [19]

Ichiyoshi

[11] Patent Number: 5,268,647
[45] Date of Patent: Dec. 7, 1993

[54] METHOD AND ARRANGEMENT OF COHERENTLY DEMODULATING PSK SIGNALS USING A FEEDBACK LOOP INCLUDING A FILTER BANK

[75] Inventor: Osamu Ichiyoshi, Tokyo, Japan
[73] Assignee: NEC Corporation, Tokyo, Japan
[21] Appl. No.: 947,700
[22] Filed: Sep. 21, 1992

[30] Foreign Application Priority Data

Sep. 19, 1991 [JP] Japan .................................. 3-239968

[51] Int. Cl.⁵ ........................ H03D 3/00; H04L 27/22
[52] U.S. Cl. .................................. 329/308; 329/307; 375/81; 375/86
[58] Field of Search ............... 329/304, 306, 307, 308, 329/309; 375/52, 53, 54, 55, 56, 57, 80, 81, 82, 83, 84, 85, 86, 87; 331/17

[56] References Cited

U.S. PATENT DOCUMENTS

| | | | |
|---|---|---|---|
| 4,510,461 | 4/1985 | Dickes et al. | 331/1 A |
| 4,942,591 | 7/1990 | Nease et al. | 375/84 |
| 5,017,883 | 5/1991 | Divsaler et al. | 329/304 |
| 5,170,415 | 12/1992 | Yoshida et al. | 375/80 |

Primary Examiner—David Mis
Attorney, Agent, or Firm—Sughrue, Mion, Zinn, Macpeak & Seas

[57] ABSTRACT

In order to coherently demodulate an incoming multiphase PSK analog signal irrespective of large frequency deviation, an automatic frequency feedback loop is provided. An analog baseband signal is generated by multiplying the IF analog signal by a local signal and then is converted into the corresponding digital baseband signal. A multiplier multiplies the digital baseband signal by another local signal. The output of the multiplier is further multiplied and then applied to a plurality of single-tuned filters which are arranged in parallel and have tuning frequencies each different from an adjacent frequency by a predetermined frequency interval. Each of the plurality of single-tuned filters generates a signal for use in carrier recovery, a frequency error signal and a correlation coefficient. Subsequently, one of the plurality of single-tuned filters is selected in a manner wherein the maximum value is detected among the correlation coefficients. The another local signal is generated using the frequency error signal of the single-tuned filter which has been selected. A modulating signal is reproduced using the recovered carrier in a conventional manner.

4 Claims, 6 Drawing Sheets

METHOD AND ARRANGEMENT OF COHERENTLY DEMODULATING PSK SIGNALS USING A FEEDBACK LOOP INCLUDING A FILTER BANK

BACKGROUND OF THE INVENTION

1. Field of the Invention

The present invention relates to a method and arrangement of coherently demodulating PSK (Phase Shift Keying) signals, and more specifically to such a method and arrangement via which an incoming multiphase-modulated signal can effectively be reproduced irrespective of a large amount of carrier frequency deviations and via which proper operations can be assured under low C/N (carrier to noise ratio) environments. The present invention is well suited for use in a mobile communications system by way of example.

2. Description of the Prior Art

As is known in the art, coherent (viz., synchronous) demodulation is to detect baseband signals through multiplication of incoming modulated IF (Intermediate Frequency) signals by a reproduced carrier signal.

Figure 1:
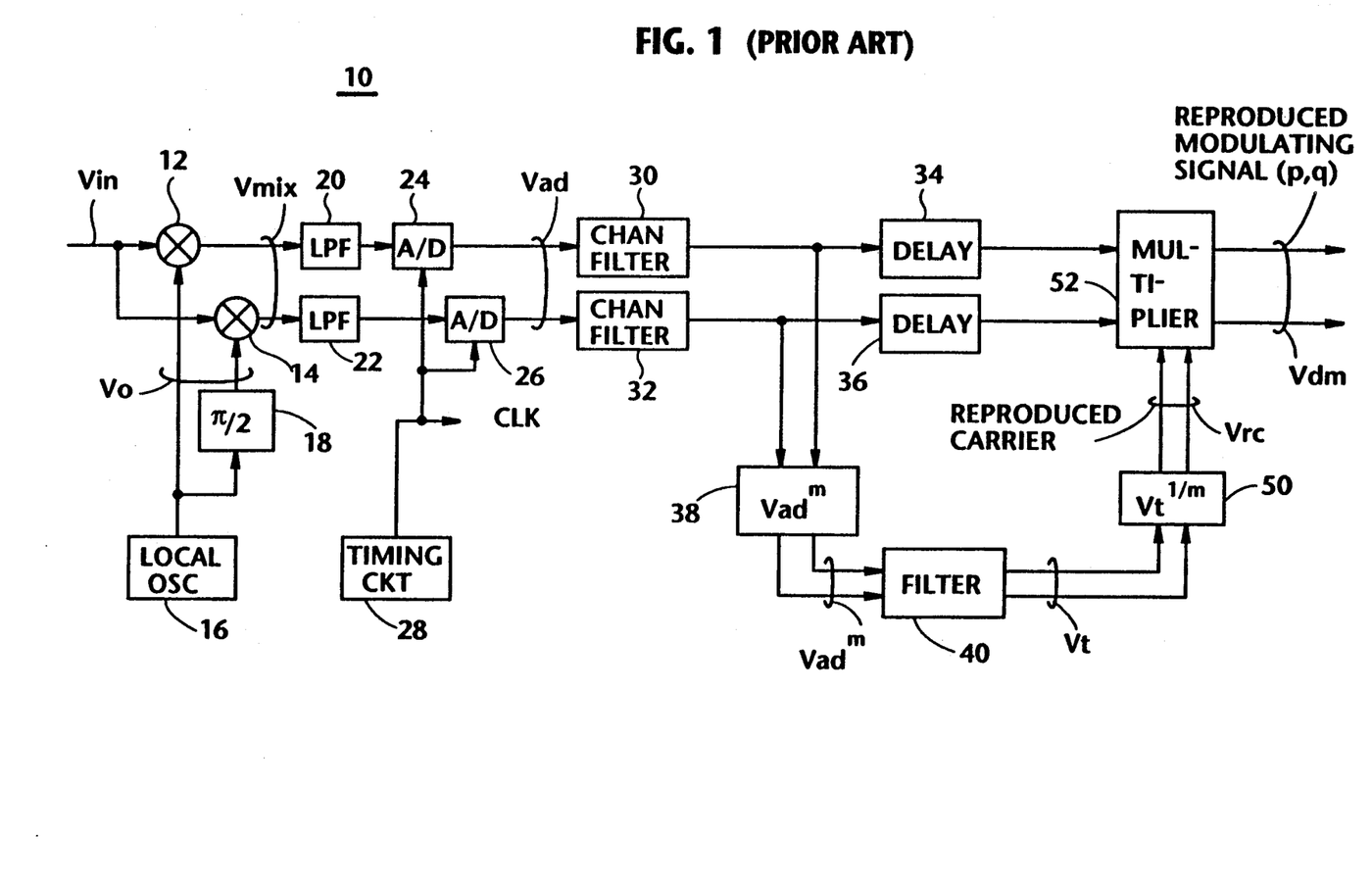
FIG. 1 is a block diagram showing the prior art arrangement discussed in the opening paragraphs of the instant disclosure.
Figure 2:
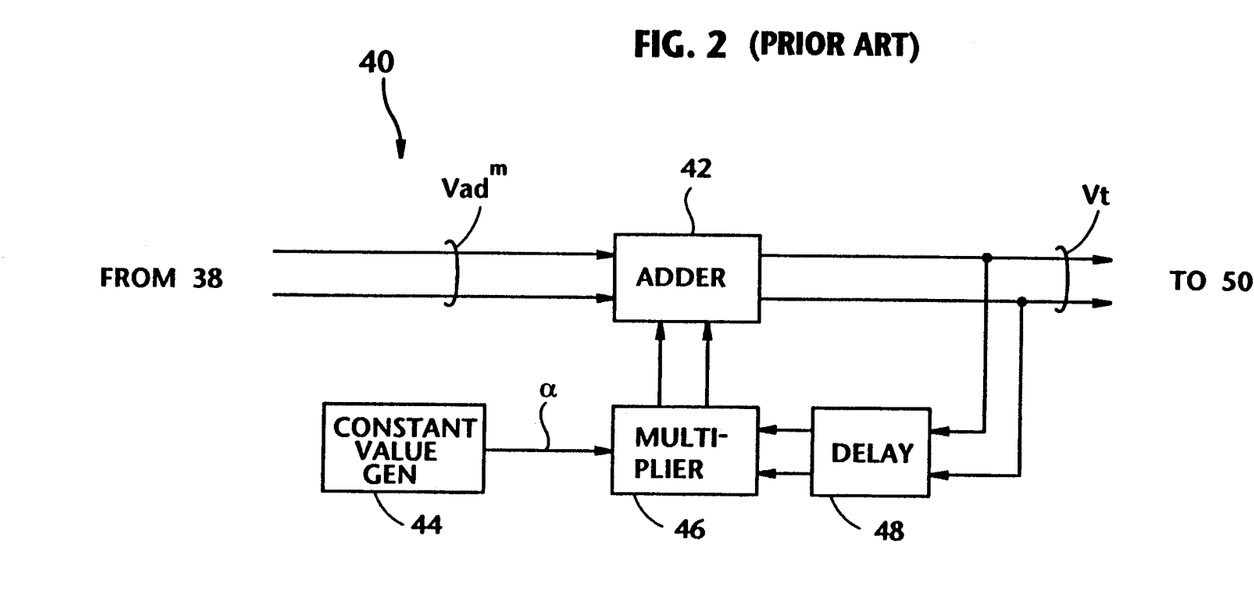
FIG. 2 is a block diagram showing a filter which forms part of the FIG. 1 arrangement.

Before turning to the present invention it is deemed preferable to discuss a prior art technique with reference to FIGS. 1 and 2. FIG. 1 is a block diagram showing a conventional coherent demodulator which is generally depicted by reference numeral 10. FIG. 2 is a block diagram illustrating in detail a single-tuned filter of FIG. 1.

In FIG. 1, a m-phase phase-modulated analog IF signal Vin is applied to two mixers 12, 14 (m is a positive integer such as 2, 4, 8, 16, ...). The incoming signal Vin is given by $$V_{in} = p\cos(W_c t + \theta_c) - q\sin(W_c t + \theta_c) \quad (1)$$
$$= 1/2\{(p+jq)e^{j(W_c t+\theta_c)} + (p-jq)e^{-j(W_c t+\theta_c)}\}$$

where p, q indicate respectively modulating signals, Wc an angular frequency of a carrier signal, and $e^{j(W_o t+\theta_o)}$ the carrier signal.

The mixer 12 is coupled to a local oscillator 16 while the other mixer 14 is coupled, via a $\pi/2$ phase shifter 18, to the oscillator 16. A local signal Vo generated from the blocks 16, 18 is given by $$V_o = e^{(W_o t+\theta_o)} \quad (2)$$
$$= \cos(W_o t + \theta_o) + j\sin(W_o t + \theta_o)$$

In more specific terms, if the output of the local oscillator 16 is cos (Wot+$\theta_o$) then the output of the phase shifter 18 is sin (Wot+$\theta_o$) or vice versa. The output of the mixers 12, 14 (denoted by Vmix) is written by $$V_{mix} = V_{in} V_o^* = \quad (3)$$
$$(p+jq)e^{j(W_r t+\theta_r)} + [\text{components of } (W_o + W_c)]$$

where * indicates a conjugate complex number, and $$Wr = Wc - Wo$$
$$\theta r = \theta c - \theta o$$

Low-pass filters (LPFs) 20, 22 are provided to remove the second term of the right side of equation (3). Thus, analog-to-digital (A/D) converters 24, 26 produce the following signal Vad.

$$V_{ad} = (p+jq)e^{j(W_r t+\theta_r)} \quad (4)$$

A timing circuit 28 is provided to apply timing clocks (CLKs) to a plurality of digital blocks which follow the low-pass filters 20, 22. The application of timing clocks to digital blocks, however, is not shown merely for the sake of simplifying drawings.

The output Vad of the A/D converters 24, 26 is applied, via channel filters (viz. matched filters) 30 and 32, to delay circuits 34, 36 and also to a multiplier (viz., power-of-m circuit) 38.

The multiplier 38 multiplies the output Vad by itself m times and generates a signal denoted by $V_{ad}^m$.

$$V_{ad}^m = (p+jq)^m e^{jm(W_r t+\theta_r)} \quad (5)$$
$$= e^{jm(W_r t+\theta_r)} + [\text{noise components}]$$

The multiplier 38 applies the output thereof to a single-tuned filter 40 which, as shown in FIG. 2, includes an adder 42, a constant value generator 44, a multiplier 46 and a delay circuit 48. The constant value generator 44 issues a real value denoted by $\alpha$, while the delay circuit 48 retards the output of the adder 42 by one sampling time period.

The transfer function of the filter 40 is written by $$T(Z) = 1/(1-\alpha Z^{-1}) \quad (6)$$

where $Z = e^{ST}$ (S is a differential operator, and T a sampling period).

If the sampling frequency is sufficiently high, equation (6) can be approximated as follows.

$$T(S) = \{1/(1=\alpha)\}/(1+S\tau) \quad (7)$$

where $\tau = \alpha T/(1-\alpha)$

Thus, the output of the filter 40, denoted by Vt, is given by $$V_t = \{1/\sqrt{1+(W_r\tau)^2}\} e^{j\{m(W_r t+\theta_r)-\tan^{-1}mW_r\tau\}} + \quad (8)$$

[noise components]

Accordingly, the frequency error Wr causes the following problems.

(a) The amplitude of Vt is lowered and thus C/N is reduced; and (b) Phase drift represented by $\tan^{-1}mW_r\tau$ is undesirably induced.

Merely for the convenience of simplifying the discussion, it is assumed that the value of $\alpha\tau$ is sufficiently small.

A divider 50 divides the received signal by itself m times and, generates the output (denoted by Vrc) which is a reproduced carrier and written by $$V_{rc} = V_t^{1/m} = e^{j\{(W_r t+\theta_r)-\tan^{-1}W_r\tau\}}$$

Following this, the reproduced carrier Vrc is multiplied by Vad at the multiplier 52 (FIG. 1). Thus, the modulating signals p, q are reproduced at the output of the multiplier 52. The output of the multiplier 52 (denoted by Vdm) is given by $$Vdm = Vad\ Vrc^* \quad (9)$$
$$= (p + jq)e^{j\tan^{-1}W\tau}$$
$$= (p + jq)e^{jW\tau}$$

It is understood that in order to accurately reproduce the modulating signals p and q, the frequency difference Wrt should be rendered zero.

As mentioned above, merely one filter (viz., filter 40) is provided in the conventional coherent demodulator 10 and, accordingly it is extremely difficult to properly determine or design the pass-band of the filter 40. That is, if the pass-band of the filter 40 is narrowed to increase a signal-to-noise ratio (S/N) for complying with low C/N environments, it may fail to transfer the received signal therethrough if the frequency difference Wrτ exhibits a large amount of value. Conversely, if the pass-band is extended or widened, another problem is caused which undesirably lowers S/N. Further, if a large amount of frequency deviation occurs in the carrier, the prior art may be unable to implement the coherent detection using such a single filter.

SUMMARY OF THE INVENTION

It is an object of the present invention to provide a method which eliminates or effectively reduces the above mentioned prior art problems.

Another object of the present invention is to provide a hardware arrangement which eliminates or effectively reduces the above mentioned prior art problems.

Still another object of the present invention is to provide a method wherein a feedback loop including a plurality of filters is provided to effectively replicate a carrier irrespective of the frequency deviation thereof exhibits a large value.

Still another object of the present invention is to provide a hardware arrangement wherein a feedback loop including a plurality of filters is provided to effectively reproduce a carrier irrespective of the frequency deviation thereof exhibits a large value.

These objects are fulfilled by a technique wherein in order to coherently demodulate an incoming multi-phase PSK analog signal irrespective of large frequency deviation, an automatic frequency feedback loop is provided. An analog baseband signal is generated by multiplying the IF analog signal by a local signal and then is converted into the corresponding digital baseband signal. A multiplier multiplies the digital baseband signal by another local signal. The output of the multiplier is further multiplied and then applied to a plurality of single-tuned filters which are arranged in parallel and have tuning frequencies each different from an adjacent frequency by a predetermined frequency interval. Each of the plurality of single-tuned filters generates a signal for use in carrier recovery, a frequency error signal and a correlation coefficient. Subsequently, one of the plurality of single-tuned filters is selected in a manner wherein the maximum value is detected among the correlation coefficients. The another local signal is generated using the frequency error signal of the single-tuned filter which has been selected. A modulating signal is reproduced using the recovered carrier in a conventional manner.

A first object of the present invention comes in a method of coherently detecting a multi-phase PSK IF analog signal, comprising the steps of: (a) generating an analog baseband signal by multiplying the multi-phase PSK IF analog signal by a first local signal; (b) converting the analog baseband signal into the corresponding digital baseband signal; (c) generating a first signal by multiplying the digital baseband signal by a second local signal; (d) generating a second signal by multiplying the first signal predetermined times; (e) applying the second signal to a plurality of single-tuned filters which are arranged in parallel and have tuning frequencies each different from an adjacent frequency by a predetermined frequency interval, each of the plurality of single-tuned filters generating a third signal, a frequency error signal and a correlation coefficient between input and output thereof; (f) selecting one of the plurality of single-tuned filters by detecting the maximum value among the correlation coefficients; (g) generating the second local signal using the frequency error signal of the single-tuned filter which has been selected in step (f); (h) generating a reproduced carrier by dividing the third signal the predetermined times; and (i) reproducing a modulating signal by multiplying the first signal by the reproduced carrier.

A second aspect of the present invention comes in an arrangement of coherently detecting a multi-phase PSK IF analog signal, comprising: first means for generating an analog baseband signal by multiplying the multi-phase PSK IF analog signal by a first local signal; second means which is coupled to the first means and converts the analog baseband signal into the corresponding digital baseband signal; third means which is coupled to the second means and generates a first signal by multiplying the digital baseband signal by a second local signal; fourth means for generating a second signal by multiplying the first signal predetermined times; fifth means for applying the second signal to a plurality of single-tuned filters which are arranged in parallel and have tuning frequencies each different from an adjacent frequency by a predetermined frequency interval, each of the plurality of single-tuned filters generating a third signal, a frequency error signal and a correlation coefficient between input and output thereof; sixth means for selecting one of the plurality of single-tuned filters by detecting the maximum value among the correlation coefficients; seventh means for generating the second local signal using the frequency error signal of the single-tuned filter which has been selected by the sixth means; eighth means for generating a reproduced carrier by dividing the third signal the predetermined times; and ninth means for reproducing a modulating signal by multiplying the first signal by the reproduced carrier.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

An embodiment of the present invention will be discussed with reference to FIGS. 3 to 7.

Figure 3:
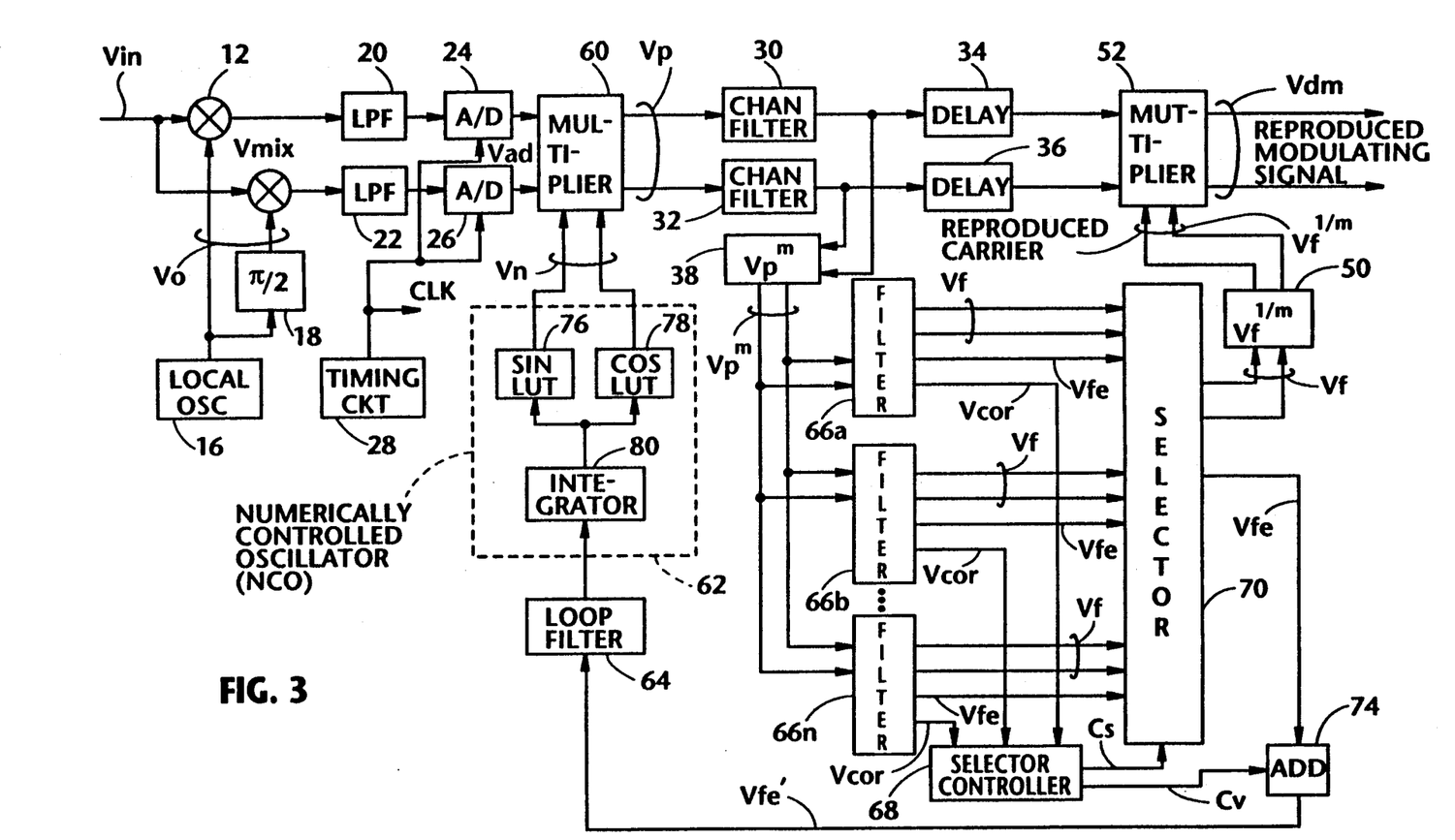
FIG. 3 is a block diagram showing an embodiment of the present invention.

In brief, the arrangement of FIG. 3 differs from that of FIG. 2 in that the former arrangement further includes, a first multiplier 60, a numerically controlled oscillator (NCO) 62, a loop filter 64, a plurality of filters 66a-66n, a selector controller 68, a selector 70 and an adder 74. As shown, the NCO 62 includes a SINE look-up table (LUT) 76, a COSINE look-up table (LUT) 78 and an integrator 80.

The filters 66a-66n are configured in the same manner with one another and takes the form of a single-tuned type. The frequency interval between the tuning frequencies of the adjacent filters is $\Delta W$.

Figure 4:
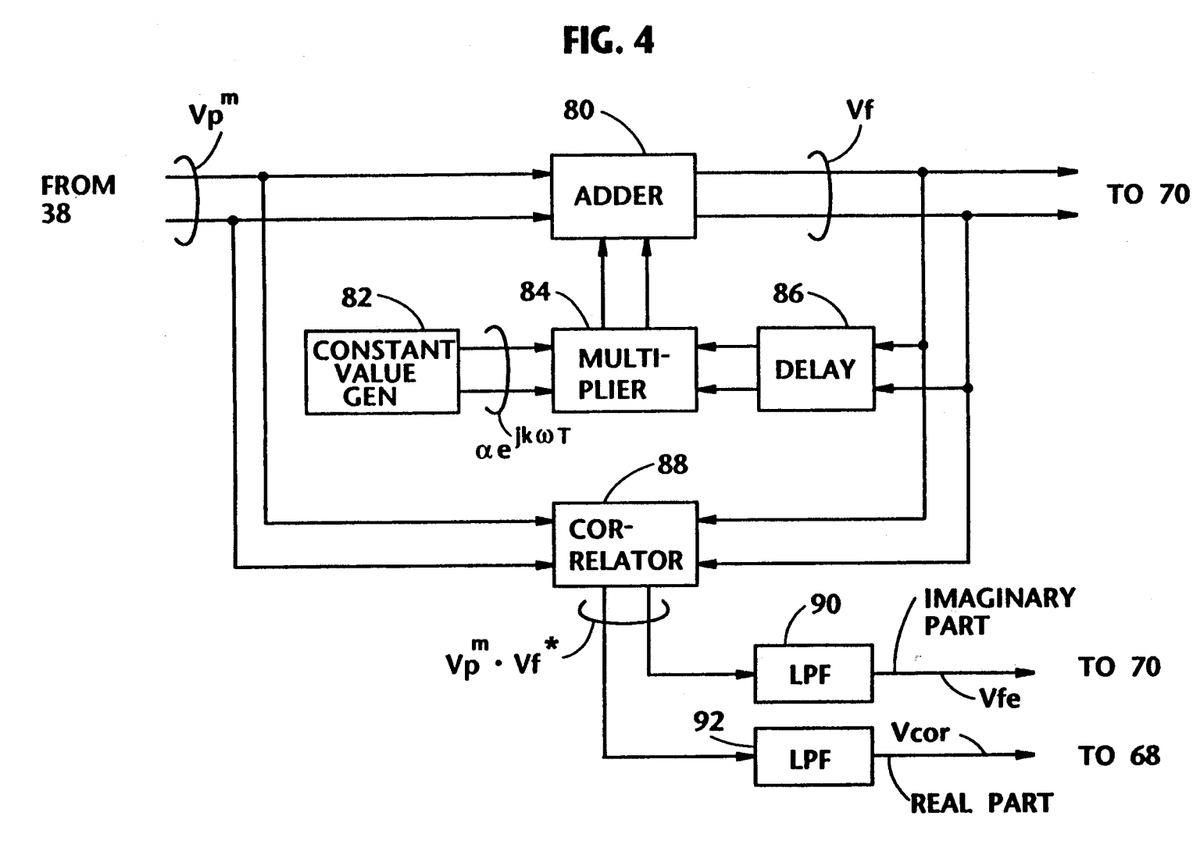
FIG. 4 is a block diagram showing one of a plurality of filters which form part of the FIG. 3 arrangement.

FIG. 4 is a block diagram showing in detail one of the filter bank (viz., filters 66a-66n) which includes an adder 80, a constant value generator 82 which issues a complex value (viz., $e^{jkWT}$ where W is an angular frequency and T a sampling time period), a multiplier 84, a delay circuit 86, a correlator 88 and two low-pass filters 90, 92.

Figure 5:
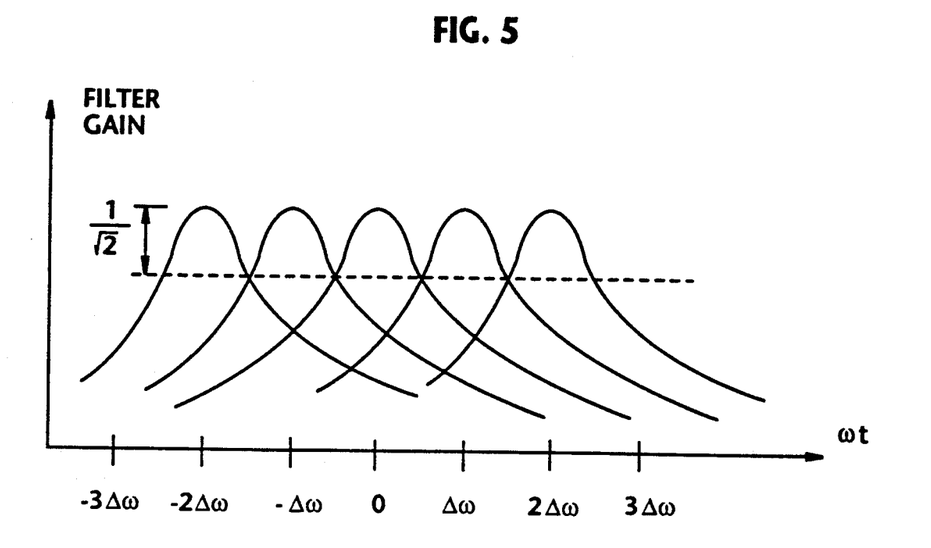
FIG. 5 is a diagram showing a plurality of tuning frequencies of the filters in relation to filter gains thereof.

Merely for the convenience of discussion, the tuning frequencies of the filters 66a-66n are denoted by $k\Delta W$ ($k=0, \pm 1, \pm 2, \ldots$) as illustrated in FIG. 5. Thus, the transfer function $T(Z;k)$ of the filter which has the tuning frequency $k\Delta W$, can be represented by $$T(Z;k) = 1/(1 - a e^{jk\Delta WT} Z^{-1}) \tag{10}$$

Z has been defined in connection with equation (6). Equation (10) is rewritten by $$T(W;k) = T(W - k\Delta W;0) \tag{11}$$

It is assumed that the output of the NCO 62 (denoted by Vn) is represented by $$Vn = e^{j(Wn + \theta n)} \tag{12}$$

Thus, the multiplier 60 generates the output thereof (denoted by Vp) which is given by $$\begin{aligned} Vp &= Vad \, Vn^* \\ &= (p + jq)e^{j(Wpt + \theta p)} \end{aligned} \tag{13}$$

where $$Wp = Wad - Wn$$

$$\theta p = \theta ad - \theta n$$

The value Wp indicates a frequency deviation of the carrier.

The output of the multiplier (viz., power-of-m circuit) 38 is given by $$\begin{aligned} Vp^m &= (p + jq)^m e^{jm(Wpt + \theta p)} \\ &= e^{jm(Wpt + \theta p)} + [\text{noise components}] \end{aligned} \tag{14}$$

The output $Vp^m$ is applied to the filters 66a-66n.

As mentioned above, it is assumed that the filter shown in FIG. 4 is a filter which has the tuning frequency $k\Delta W$. The output $Vp^m$ is applied to the adder 80 and the correlator 88. The delay circuit 86 retards the output of the adder 80 by one sampling time period. The transfer function of the filter is given by equation 10 and hence the output of the adder 80 (viz., the output of the filter shown in FIG. 4) can be written by $$Vf = \{1/\sqrt{1 + (mWp - k\Delta W)^2 \tau^2}\} \times \tag{15}$$

$$e^{j\{(Wpt + \theta p) - \tan^{-1}(mWp - k\Delta W)\tau\}}$$

Deriving equation (15) is known to those skilled in the art and does not important to an understanding of the present invention, and thus will be omitted for brevity.

On the other hand, the output of the correlator 88 is given by the following equation.

$$\begin{aligned} Vp^m \cdot Vf^* &= \{1/\sqrt{1 + (mWp - k\Delta W)^2 \tau^2}\} \times \\ &\quad e^{j\tan^{-1}(mWp - k\Delta W)\tau} \\ &= 1/\{1 + (mWp - k\Delta W)^2\} + \\ &\quad j\{(mWp - k\Delta W)/(1 + (mWp - k\Delta W)^2)\} \end{aligned} \tag{16}$$

The real part of equation (16) indicates a correlation coefficient and is applied, via the LPF 92, to the selector controller 68 as Vcor. On the other hand, the imaginary part of equation (27) indicates a tuning frequency error value and is applied, via the LPF 90, to the selector 70 as Vfe.

The selector controller 68 determines which is the highest value among the correlation coefficients applied thereto from the filters 66a-66n. It is assumed that the filter 66b has the tuning frequency $\Delta W$ and issues the highest correlation coefficient. In such a case, the controller 68 produces a control signal Cs which indicates the filter 66b. The selector 70 selects the filter 66b in response to the control signal Cs, and thus acquires the complex signal Vf and the frequency error signal Vfe both from the filter 66b. The signal Vf is relayed to the divider 50, while the frequency error signal Vfe to the adder 74. The demodulated signal Vdm derived from the multiplier 52 is given by $$Vdm = (p + jq)e^{jWp\tau} \tag{17}$$

The frequency deviation Wp of equation (17) should be rendered zero in order to exactly reproduce the modulating signals p and q. This is implemented using the feedback path which includes the adder 74, the loop filter 64 and the NCO 62.

Figure 6:
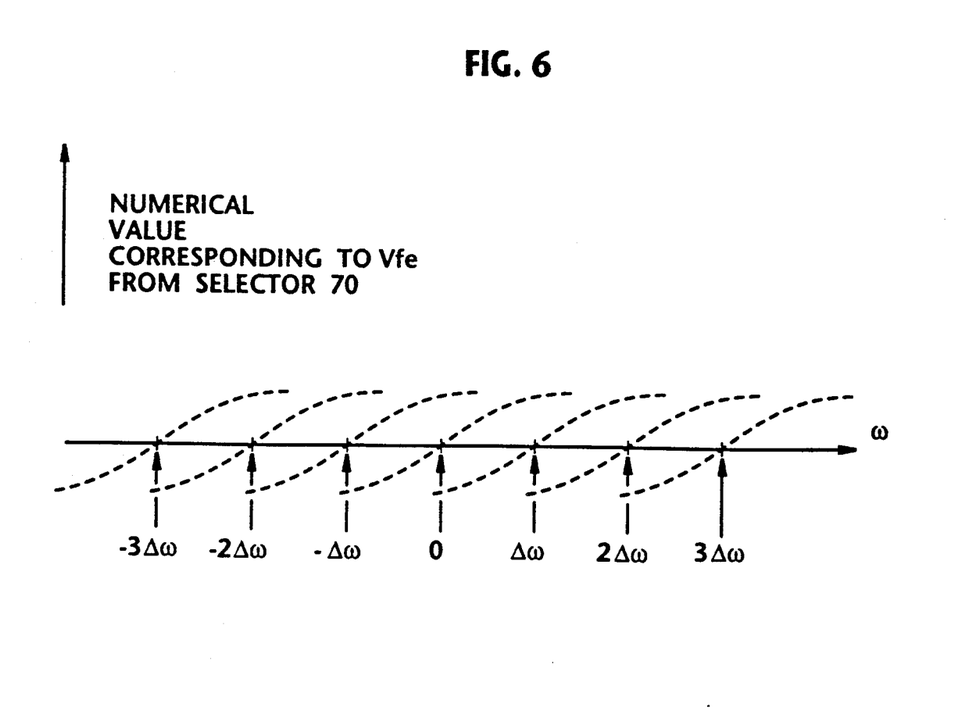
FIG. 6 is a diagram showing numerical values which are respectively indicated by frequency error signals generated from the filter bank of FIG. 3.

FIG. 6 is a diagram which shows a plurality of characteristic curves which respectively indicate numerical values of the error signals Vfe outputted from the selector 70. In FIG. 6, the tuning frequencies of the filters 66a, 66b, 66c, 66d, 66e, ..., 66n are respectively denoted 0, $+\Delta W$, $-\Delta W$, $+2\Delta W$, $-2\Delta W$, $+3\Delta W$, $-3\Delta W$, ..., $+n\Delta W$ and $-n\Delta W$ (for example).

Figure 7:
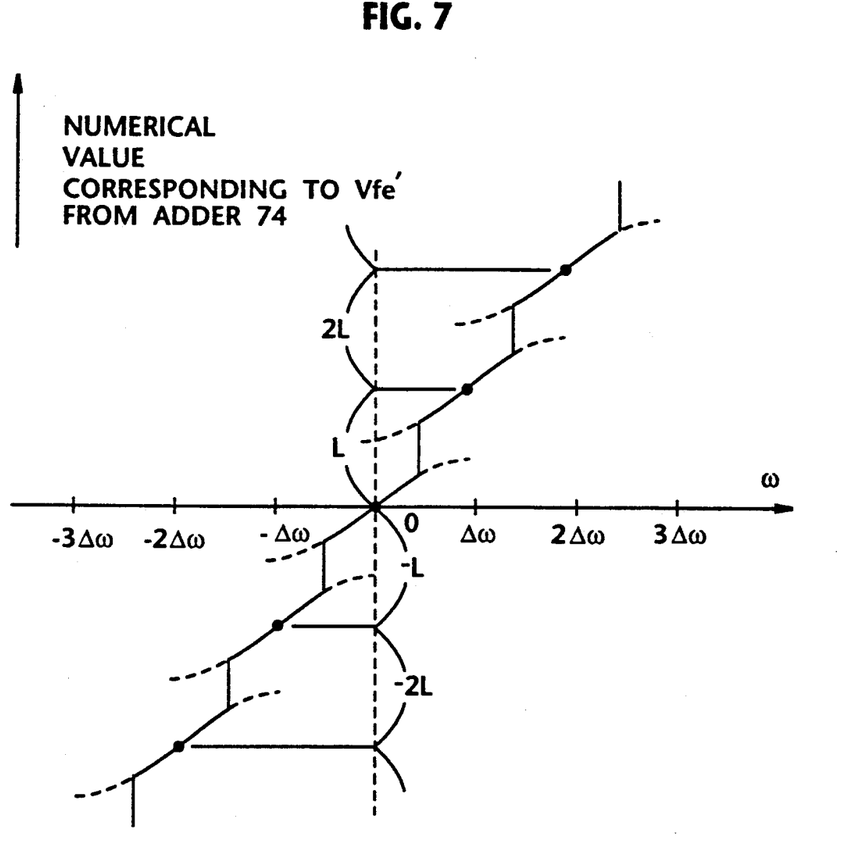
FIG. 7 is a diagram showing numerical values which are derived by shifting the values shown in FIG. 6.

It is assumed that the selector controller 68 selects the filter 66b. In this instance, the controller 68 supplies the adder 74 with a control signal Cv which indicates a predetermined constant (depicted by L). Thus, the characteristic curve with the tuning frequency ΔW is shifted by L as shown in FIG. 7. Similarly, if the selector 68 selects the filter 66d, the selector controller 68 supplies the adder 74 with a constant signal Cv indicative of a constant value 2L. Accordingly, the curve with the tuning frequency 2ΔW is shifted by 2L as illustrated.

The output of the adder 74 is applied, via the loop filter 64, to the integrator 80 of the NCO 62. The integrator 80 is a digital differential analyzer which accumulates the numerical values applied from the adder 74 using the timing clocks (CLKs). The integrated values are successively applied to the SINE and COSINE look-up tables 76, 78 which in turn generate the signal Vn (see equation (12). Following this, Vn is multiplied by the complex signal Vad as mentioned above. Thus, the frequency deviation Wp in the output of the multiplier 60 gradually approaches zero and ultimately converges to zero.

According to the present invention, even if the frequency deviation Wp exhibit a large value such that the prior art filter is unable to tune to the signal applied thereto, the filter bank of the present invention is able to successfully tune to the received signal using one of the filters 66a–66n. Thus, the frequency deviation Wp is eventually rendered zero.

It will be understood that the above disclosure is representative of one possible embodiment of the present invention and its variant and that the concept on which the invention is based is not specifically limited thereto.

What is claimed is:

1. A method of coherently detecting a multi-phase PSK IF analog signal, comprising the steps of:
   (a) generating an analog baseband signal by multiplying said multi-phase PSK IF analog signal by a first local signal;
   (b) converting said analog baseband signal into the corresponding digital baseband signal;
   (c) generating a first signal by multiplying said digital baseband signal by a second local signal;
   (d) generating a second signal by multiplying said first signal predetermined times;
   (e) applying said second signal to a plurality of single-tuned filters which are arranged in parallel and have tuning frequencies each different from an adjacent frequency by a predetermined frequency interval, each of said plurality of single-tuned filters generating a third signal, a frequency error signal and a correlation coefficient between input and output thereof;
   (f) selecting one of said plurality of single-tuned filters by detecting the maximum value among the correlation coefficients;
   (g) generating said second local signal using the frequency error signal of the single-tuned filter which has been selected in step (f);
   (h) generating a reproduced carrier by dividing said third signal said predetermined times; and
   (i) reproducing a modulating signal by multiplying said first signal by said reproduced carrier.

2. A method as claimed in claim 1, wherein step (g) includes the steps of:
   (j) shifting numerical values defined by the frequency error signal which has been selected in step (f) by a predetermined value, said predetermined value being changed according to which single-tuned filter is selected in step (f); and
   (k) applying said numerical values shifted in step (j) to a numerically controlled oscillator, said numerically controlled oscillator generating said second local signal in response to said numerical values applied thereto.

3. An arrangement of coherently detecting a multi-phase PSK IF analog signal, comprising:
   first means for generating an analog baseband signal by multiplying said multi-phase PSK IF analog signal by a first local signal;
   second means which is coupled to said first means and converts said analog baseband signal into the corresponding digital baseband signal;
   third means which is coupled to said second means and generates a first signal by multiplying said digital baseband signal by a second local signal;
   fourth means for generating a second signal by multiplying said first signal predetermined times;
   fifth means for applying said second signal to a plurality of single-tuned filters which are arranged in parallel and have tuning frequencies each different from an adjacent frequency by a predetermined frequency interval, each of said plurality of single-tuned filters generating a third signal, a frequency error signal and a correlation coefficient between input and output thereof;
   sixth means for selecting one of said plurality of single-tuned filters by detecting the maximum value among the correlation coefficients;
   seventh means for generating said second local signal using the frequency error signal of the single-tuned filter which has been selected by said sixth means;
   eighth means for generating a reproduced carrier by dividing said third signal said predetermined times; and
   ninth means for reproducing a modulating signal by multiplying said first signal by said reproduced carrier.

4. An arrangement as claimed in claim 3, wherein said seventh means includes:
   tenth means for shifting numerical values defined by the frequency error signal, which has been selected by seventh means, by a predetermined value, said predetermined value being subject to a change according to which single-tuned filter is selected by said seventh means; and
   a numerically controlled oscillator which is coupled between said third and tenth means and receives said numerical values shifted by tenth means, said numerically controlled oscillator generating said second local signal in response to said numerical values applied thereto.

* * * * *

UNITED STATES PATENT AND TRADEMARK OFFICE
CERTIFICATE OF CORRECTION

PATENT NO. : 5,268,647

DATED : December 7, 1993

INVENTOR(S) : Osamu ICHIYOSHI

It is certified that error appears in the above-identified patent and that said Letters Patent is hereby corrected as shown below:

Col. 1, line 41, delete "Wot + $\theta$o" and insert --Wct + $\theta$c--.

Signed and Sealed this

Twentieth Day of September, 1994

Attest:

BRUCE LEHMAN

Attesting Officer     Commissioner of Patents and Trademarks